June 14, 1960 H. G. PLUST ET AL 2,940,878
PROCESS FOR THE PRODUCTION OF SEMICONDUCTOR RECTIFIERS
Filed Feb. 20, 1958
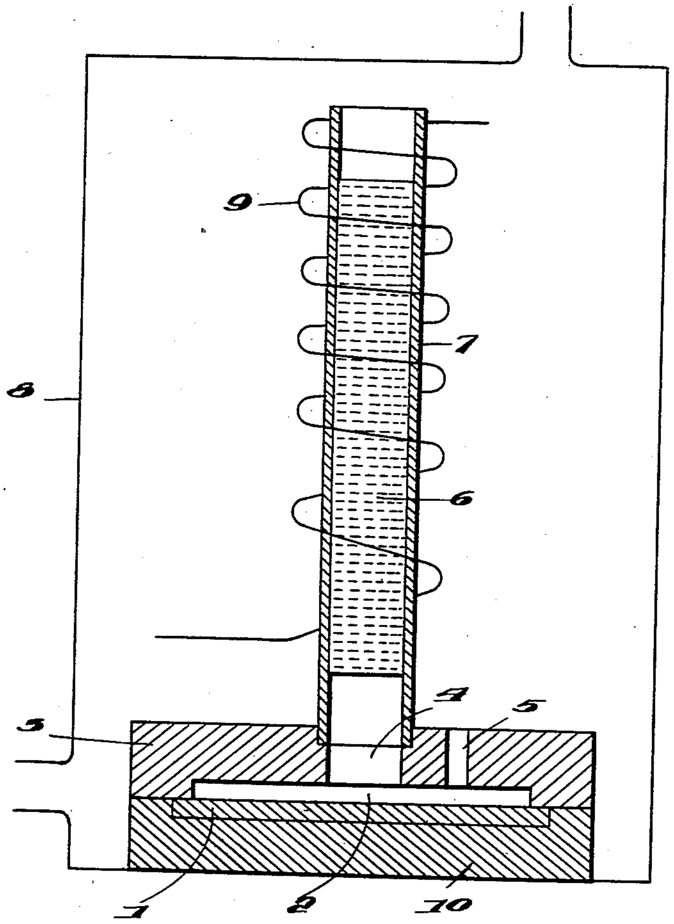
INVENTORS
Heinz Günther Plust and
Bernhard Seraphin,
BY Pierce, Scheffler & Parker
their ATTORNEYS United States Patent Office 2,940,878

Patented June 14, 1960

2,940,878

PROCESS FOR THE PRODUCTION OF SEMI-CONDUCTOR RECTIFIERS

Heinz Günther Plust and Bernhard Seraphin, Wettingen, Switzerland, assignors to Aktiengesellschaft Brown, Boveri & Cie, Baden, Switzerland Filed Feb. 20, 1958, Ser. No. 716,390

Claims priority, application Switzerland Mar. 5, 1957

3 Claims. (Cl. 148—1.5)

The invention relates to a process for the production of semiconductor rectifiers according to the so-called "alloy technique." According to this technique, a suitable coating substance (indium, for example), is applied to a surface of the semiconductor body (for example, n-conductive germanium) and this substance is alloyed and diffused into the semiconductor body by thermal treatment. The migration of foreign atoms results, in the affected zone, in a reversal of the previously uniform type of conduction of the semiconductor body, so that the p-n transition is formed in the interior of the semiconductor body with the rectifying barrier layer.

In these rectifiers the p-n transition pierces the surface of the semiconductor body. The processes connected with the thermal treatment effect the precipitation of metallic and other impurities on the surface, and this results along the line of penetration in an electrical bridging of the p-n transition and, thus, in a substantial reduction of its blocking capacity. These precipitates can to some extent be eliminated by chemical or electrolytic etching. However, this possibility of purification fails if the p-n transition pierces the surface of the semiconductor body at those points which are not accessible to an external treatment such as is etching. Such inner passages (inaccessible to an etching treatment) can exist in hollow spaces which may have been formed in the alloying process at the boundary surface between the semiconductor and the coating substance; naturally, these cannot be purified by an external treatment. In such case, the blocking effect of the systems remains insufficient, even after intensive outside etching. Since the hollow spaces have an adverse effect on the blocking characteristic, the avoidance of these hollow spaces represents one of the main problems in the manufacture of semiconductor rectifiers.

It can be shown that the cause of the formation of hollow spaces is to be found substantially in the fact that the surface of the coating substance coming into contact with the semiconductor body is partly covered with an oxide film. The object of the process according to the present invention is the application of the coating substance to the semiconductor body while eliminating interfering oxide films. This process permits the production of rectifiers with practically any desired dimension of the barrier layer. It is characterized in that the coating substance is charged suddenly in liquid form into a mold attached to the semiconductor body, this mold comprising—together with the semiconductor body itself—a chamber that is substantially closed from all sides; in that the coating substance is purified by a segregating effect immediately before its flows into the mold; and that the alloying operation is started after the coating substance has been applied to a face of the body.

The object of the various measures, which form in their totality the process according to the invention, is the following: By using a mold, which—together with the semiconductor body itself—forms a chamber which is at least approximately closed from all sides, and which can therefore be provided particularly with a cover extending parallel to the surface of the semiconductor body, the formation of a comparatively thin layer of the coating substance is enforced, even when the layer occupies a large area. The very rapid (sudden) application of the coating substance is effected in order to prevent the substance, which has just been purified by the segregating effect, from being contaminated again. The start of the alloying process when the coating substance covers the semiconductor body in the provided extension, effects the formation and progress of a plane alloying front, which remains always parallel to the contact surface between coating substance and semiconductor body. It is thus also possible to produce large rectifiers with a comparatively thin semiconductor body, without running the risk of the substance being alloyed through, due to a curvature of the front.

The above described process can be carried out according to the embodiment represented in the attached drawing, the single figure of which is a diagrammatic representation of an apparatus suitable for use in carrying out the process. In the drawing, 1 is the semiconductor body, consisting, for example, of germanium, which is to be covered with the coating substance (for example, indium). The latter is to be located in the chamber 2, which is terminated, on the one hand, by the semiconductor itself and, on the other hand, by the mold, 3, consisting, for example, of graphite. Semiconductor body and mold enclose the chamber 2 practically completely; the chamber is terminated particularly by a face extending parallel to the semiconductor body and spaced a small distance therefrom. Only for charging the coating substance and for the evacuation of the chamber 2, respectively—the latter to be described later—are openings 4 and 5 provided in the above-mentioned face of the mold. The coating substance 6 is contained first in solid form in the tube 7, consisting, for example, of glass; the amount of the coating substance in the tube is to correspond exactly to the amount required for the production of a rectifier. The tube 7 is inserted in the opening 4 of the mold, and the whole arrangement is placed in the interior of the vacuum-tight casing, indicated by 8. In order to remove the oxygen the vessel 8 is evacuated, if necessary, after rinsing with a protective gas. The semiconductor body is then kept at a temperature which is above the melting temperature of the coating substance but below the temperature range in which the alloying takes place to any considerable extent. The heating of the semiconductor body can be effected by electrical heating of its envelope, consisting, for example, of graphite (parts 3 and 10). Then the coating substance is heated by the effect of the spirally arranged, electrically fed heating filament 9 until it liquefies. The arrangement is such that the heating is delayed at the lower end of the column 6. This measure is indicated in the drawing in that the windings of the heating spiral 9 are wider in the lower region of the column 6 than in the upper region. In the alternative, the lower region of the column 6 can also be heated by a separate winding, which is connected later. After the liquefaction of the bottom section of the coating substance, the latter drops suddenly from the tube 7 into the evacuated chamber 2. Any oxide film which may have formed on the coating substance in the tube 7 adheres to the walls of the tube 7, due to the segregating effect. This purifying effect is enhanced by the fact that the bottom part of the tube is kept free during the charging of the coating substance.

After charging the coating substance into the chamber 2, the alloying process can be started immediately, for example, by electrical heating of the parts 3 and 10, to the alloying temperature. But it is also possible to remove the semiconductor body covered with the coating substance from the device as shown in the drawing, and to effect the alloying at a later date.

The semiconductor rectifiers produced according to the process of the invention are characterized by the complete absence of hollow spaces or other poor return current points. The inverse current density, for example in series-produced germanium-indium rectifiers with a barrier layer of 3.2 cm.$^2$, is only 12 $\mu$a./mm.$^2$ at 100 v. The above mentioned rectifiers can be loaded with inverse voltages of 400 v.

We claim:

1. In the process for the production of a semiconductor rectifier according to the alloy process, according to which a coating substance is applied to a substantially plane face of a semiconductor body and is alloyed with the latter by thermal treatment, the improved technique which consists essentially in the steps of disposing the semiconductor body in a mold with that face thereof to which the coating substance is to be applied being uppermost, said mold forming together with said body a closed space of which said plane face of said semiconductor body constitutes the bottom wall, disposing in a tubular extension of said closed space above and substantially spaced from said uppermost plane face of said semiconductor body a columnar mass of said coating substance in solid form, freeing said closed space from oxygen, maintaining the semiconductor body at an elevated temperature above the melting point of the coating substance but below the temperature range in which alloying between semiconductor body and coating substance takes place to any considerable extent, applying heat to the columnar mass of coating substance in such manner that the upper part of said mass becomes molten whilst the lowermost part is still solid and finally melting said lowermost part thereby suddenly dropping the melt of coating substance out of said tubular extension and onto said uppermost face of said semiconductor body whereby impurities of the coating substance in the tubular extension are segregated by their adherence to the walls of said extension, so that said molten coating substance spreads out as a thin layer covering said plane face, and thereafter further heating the so-covered semiconductor body to alloying temperature, thereby effecting the formation and progress of a plane alloying front which remains parallel to said plane face.

2. The improved process defined in claim 1, in which the amount of the mass of solid coating substance confined within said tubular extension of said closed space is substantially equal to the amount required for the production of the rectifier.

3. The improved process defined in claim 1, in which a substantial vacuum is maintained in said closed space during said melting and dropping steps.

References Cited in the file of this patent

UNITED STATES PATENTS

| | | |
|---|---|---|
| 2,765,245 | English et al. | Oct. 2, 1955 |
| 2,779,877 | Lehovec | Jan. 29, 1957 |
| 2,835,615 | Leinfelder | May 20, 1958 |
| 2,837,448 | Thurmond | June 3, 1958 |

FOREIGN PATENTS

| | | |
|---|---|---|
| 1,088,286 | France | Sept. 8, 1954 |